(12) United States Patent
Ernst et al.

(10) Patent No.: US 6,525,156 B1
(45) Date of Patent: Feb. 25, 2003

(54) STYRENE-CONTAINING POPCORN POLYMERS, METHOD FOR PRODUCING SAME AND UTILISATION

(75) Inventors: Andreas Ernst, Worms (DE); Helmut Meffert, Mannheim (DE); Axel Sanner, Frankenthal (DE); Stefan Stein, Wörrstadt (DE); Folker Ruchatz, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/959,402

(22) PCT Filed: Apr. 27, 2000

(86) PCT No.: PCT/EP00/03809

§ 371 (c)(1),
(2), (4) Date: Oct. 24, 2001

(87) PCT Pub. No.: WO00/68286

PCT Pub. Date: Nov. 16, 2000

(30) Foreign Application Priority Data

May 7, 1999 (DE) .......................................... 199 20 944

(51) Int. Cl.[7] .............................................. C08F 212/06
(52) U.S. Cl. ...................... 526/347; 526/259; 526/264; 526/336; 526/340
(58) Field of Search ................................ 526/259, 264, 526/336, 340, 347

(56) References Cited

U.S. PATENT DOCUMENTS

| 2,341,175 | A |   | 2/1944  | Britton et al. |
| 3,277,066 | A |   | 10/1966 | Grosser et al. |
| 3,933,766 | A |   | 1/1976  | Hofmann et al. |
| 4,451,582 | A | * | 5/1984  | Denzinger et al. ............ 521/38 |
| 4,658,002 | A |   | 4/1987  | Tschang et al. |
| 5,505,973 | A | * | 4/1996  | Fussnegger et al. ........ 426/422 |
| 5,599,898 | A | * | 2/1997  | Hartmann et al. .......... 528/310 |
| 5,945,032 | A | * | 8/1999  | Breitenbach et al. .. 252/186.29 |

FOREIGN PATENT DOCUMENTS

| DE | 2 255 263 | 5/1974  |
| DE | 38 18 868 | 12/1989 |
| EP | 88 964    | 9/1983  |
| EP | 177 812   | 4/1986  |

* cited by examiner

Primary Examiner—Helen L. Pezzuto
(74) Attorney, Agent, or Firm—Keil & Weinkauf

(57) ABSTRACT

Insoluble, only slightly swellable popcorn polymers containing a) from 50 to 99% by weight of styrene and/or at least one monounsaturated styrene derivative,
b) from 0.1 to 40% by weight of at least one N-vinyllactam or N-vinylamine and
c) from 0.1 to 10% by weight of at least one difunctional crosslinking component, the stated percentages by weight of the individual components a) to c) summing to 100%.

11 Claims, No Drawings

STYRENE-CONTAINING POPCORN POLYMERS, METHOD FOR PRODUCING SAME AND UTILISATION

The present invention relates to insoluble, styrene-containing popcorn polymers, processes for their preparation and the use of the popcorn polymers as adsorbents, ion exchangers, carrier materials and filter assistants.

The name popcorn polymers stands for foam-like, crusty polymer particles having a cauliflower-like structure. Owing to their generally strong crosslinking, popcorn polymers are as a rule insoluble and scarcely swellable.

DE 2 255 263 discloses a process for the preparation of insoluble, crosslinked and only slightly swellable polymers of N-vinylpyrrolidone, in which N-vinylpyrrolidone is polymerized in aqueous solution in the presence of, as a crosslinking agent, a cyclic acid amide which contains at least two ethylenically unsaturated groups. The polymerization reaction is initiated by heating the reaction solution to at least 80° C. and is completed at the boiling point of water.

U.S. Pat. No. 3,277,066 relates to a process for the preparation of insoluble polymers of N-vinyllactams by heating N-vinyllactams in water in the presence of alkali metal and alkaline earth metal oxides and hydroxides as a catalyst.

Houben-weyl, Volume 14, Makrom. Stoffe, Part 1, page 98 (1961) discloses that popcorn polymers are formed from mixtures of styrene with divinylbenzene. Such polymers are also formed in the industrial butadiene styrene polymerization. Methyl acrylate, too, tends to form popcorn polymers.

On contact with the monomers of which they are composed or with other monomers, popcorn polymers have the property of being able to convert said monomers into popcorn polymers. They act so to speak as a nucleus for the polymerization. However, the activity is lost if they come into contact with air.

Ullmanns Encyklopädie der Techn. Chemie, $4^{th}$ Edition, Volume 19, page 385 (1980), discloses that an insoluble polymer slightly swellable in water is formed on heating N-vinylpyrrolidone with hydroxides and alcoholates of the alkali metals and alkaline earth metals in a spontaneous reaction. Such substances referred to as popcorn polymers are also formed on heating N-vinylpyrrolidone with divinyl compounds in the absence of oxygen.

EP-A-0 177 812 discloses a process for the preparation of insoluble, only slightly swellable polymer powders based on monoethylenically unsaturated carboxamides, carboxylic acids and carboxylic esters, in which an active popcorn polymer is used for initiating the polymerization, said popcorn polymer being obtainable by heating a mixture of from 99.6 to 98.8% by weight of N-vinylpyrrolidone and from 0.4 to 1.2% by weight of a compound having at least 2 ethylenically unsaturated double bonds to a temperature of from 100 to 150° C. in the absence of oxygen and polymerization initiators.

These popcorn polymers are used, for example, for absorbing tannins from beverages and as ion exchangers. Carboxyl-containing popcorn polymers can also be obtained by hydrolyzing polymers containing acrylate and acrylamide units.

U.S. Pat. No. 2,341,175 describes the popcorn polymerization of styrene with polyunsaturated organic esters (e.g. allyl acrylate). The spontaneous mass polymerization of styrene and comonomer is carried out at 80° C. and in reaction times of 6–7 days. The reaction product is worked up with benzene, isolated, dried and milled. Porous, insoluble and nonswelling styrene copolymers in powder form are obtained.

EP-A-0 088 964 describes a process for the preparation of popcorn polymers of basic vinyl heterocycles and up to 30% by weight of various comonomers. The initially taken initiator is a mixture of N-vinylpyrrolidone and divinylethylene urea. After the reaction has started, the water-soluble, basic vinyl heterocycle (e.g. N-vinylimidazole) is added together with comonomer and water. Styrene is also mentioned as a suitable comonomer.

It is an object of the present invention to provide an insoluble and only slightly swellable polymer which is chemically inert and surface-rich and can be prepared simply and in acceptable reaction times. Moreover, the polymer should be economical and should be capable of being prepared as far as possible in the absence of a solvent.

It is a further object of the present invention to provide novel substances which can be used as adsorbents, ion exchangers, carrier materials and filter assistants.

We have found that this object is achieved, according to the invention, by insoluble, only slightly swellable popcorn polymers containing a) from 50 to 99% by weight of styrene and/or at least one monounsaturated styrene derivative;

b) from 0.1 to 40% by weight of at least one N-vinyllactam or N-vinylamine and c) from 0.1 to 10% by weight of at least one difunctional crosslinking component, the stated percentages by weight of the individual components a) to c) being based on the total amount of the popcorn polymer and summing to 100%.

Monounsaturated styrene derivatives are understood as meaning, inter alia, sulfo-containing styrenes, e.g. styrene-3-sulfonic acid or sodium styrene-3-sulfonate, and amino-containing styrenes. Amino-containing styrenes are to be understood as meaning, for example, styrenes which carry the following substituents in the 3 position: $-CH_2N^+(CH_3)_3$ $Cl-$, $-CH_2N^+(CH_3)_2CH_2CH_2OHCl-$, $-CH_2N(CH_3)_2$, $-CH_2NHCH_3$, or $-CH_2NH_2$. The abovementioned styrene derivatives are known, inter alia, as monomers for the preparation of ion exchange resins.

In the present invention, the monomers a) are used in amounts of from 50 to 99, preferably from 70 to 99, particularly preferably from 75 to 97, % by weight, based on the total amount of the popcorn polymer.

Hydrophilic components b) are generally understood as meaning N-vinyllactams or N-vinylamines. The following polymerizable comonomers may be mentioned as being preferred:

N-Vinyllactams and N-vinylamines, in particular N-vinylpyrrolidone, N-vinylpiperidone, N-vinylcaprolactam, N-vinylimidazole, N-vinyl-2-methylimidazole, N-vinyl-4-methylimidazole and N-vinylformamide.

Preferred hydrophilic components are N-vinylpyrrolidone, N-vinylimidazole and N-vinylcaprolactam, particularly preferably N-vinylpyrrolidone.

In the present invention, the monomers b) are used in amounts of from 0.1 to 40, preferably from 0.5 to 30, particularly preferably from 1 to 25, % by weight, based on the total amount of the popcorn polymer.

Monomers c) are generally understood as meaning compounds which contain at least 2 ethylenically unsaturated nonconjugated double bonds in the molecule and hence act as difunctional crosslinking agents in the polymerization. Preferred monomers c) are, for example, alkylenebisacrylamides, such as methylenebisacrylamide and N,N'-acryloylethylenediamine, N,N'-divinylethylene urea, N,N'-divinylpropylene urea, ethylidenebis-3-(N-vinylpyrrolidone), N,N'-divinyl-(2,2')-diimidazoleylbutane and 1,1'-bis-(3,3'-vinylbenzimidazoleith-2-one)-1,4-butane. Further suitable crosslinking agents are, for example, alkylene glycol di(meth)acrylates, such as ethylene glycol diacrylate, ethylene glycol dimethacrylate, tetraethylene glycol acrylate, tetraethylene glycol dimethacrylate, diethylene glycol acrylate, diethylene glycol methacrylate, aromatic divinyl compounds such as divinylbenzene and divinyltoluene, and vinyl acrylate, allyl acrylate, allyl methacrylate, divinyldioxane, pentaerythrityl triallyl ether and mixtures of the crosslinking agents.

Particularly preferred crosslinking agents are N,N'-divinylethyleneurea and divinylbenzene.

The crosslinking agents are used in amounts of from 0.1 to 10, preferably from 0.1 to 8, particularly preferably from 0.2 to 5, % by weight, based on the total amount of the popcorn polymer.

Popcorn polymers containing
  a) from 60 to 99% by weight of styrene,
  b) from 0.5 to 30% by weight of at least one N-vinyllactam or N-vinylamine selected from the group consisting of N-vinylpyrrolidone, N-vinylpiperidone, N-vinylcaprolactam, N-vinylimidazole and methylated N-vinylimidazole and N-vinylformamide, and
  c) from 0.1 to 8% by weight of at least one difunctional crosslinking component selected from the group consisting of N,N'-divinylethyleneurea, N,N'-divinylpropyleneurea and divinylbenzene
are preferred. Popcorn polymers containing
  a) from 70 to 97% by weight of styrene,
  b) from 1 to 25% by weight of N-vinylpyrrolidone and
  c) from 0.2 to 5% by weight of N,N'-divinylethyleneurea and/or divinylbenzene
are particularly preferred.

The novel popcorn polymers may additionally contain up to 20% by weight of further monomers d) capable of free radical polymerization, in this case the stated percentages by weight of the monomers a) to d) summing to 100%.

Further monomers d) capable of free radical polymerization are understood as meaning, inter alia, acrylic acid and methacrylic acid and their esters and amides, for example methyl, ethyl, isopropyl, n-butyl and tert-butyl esters and amides, and vinyl acetate, acrylonitrile and vinyl methyl ether.

The present invention also relates to a process for the preparation of insoluble, only slightly swellable popcorn polymers, wherein
  a) from 50 to 99% by weight of styrene and/or at least one monounsaturated styrene derivative,
  b) from 0.5 to 40% by weight of at least one N-vinyllactam or N-vinylamine and
  c) from 0.1 to 10% by weight of at least one difunctional crosslinking component,
the stated percentages by weight of the individual components a) to c) summing to 100%, are polymerized in the absence of oxygen and polymerization initiators.

The exact definition of the monomers a) to c) corresponds to the description appearing at the outset.

A process for the preparation of insoluble, only slightly swellable popcorn polymers, wherein
  a) from 70 to 99% by weight of styrene;
  b) from 0.5 to 30% by weight of at least one N-vinyllactam or N-vinylamine selected from the group consisting of N-vinylpyrrolidone, N-vinylpiperidone, N-vinylcaprolactam, N-vinylimidazole and methylated N-vinylimidazole and N-vinylformamide, and
  c) from 0.1 to 8% by weight of at least one difunctional crosslinking component selected from the group consisting of N,N'-divinylethyleneurea, N,N'-divinylpropyleneurea and divinylbenzene
are polymerized, is preferred.

The novel process in which
  a) from 75 to 97% by weight of styrene,
  b) from 1 to 25% by weight of N-vinylpyrrolidone and
  c) from 0.2 to 5% by weight of N,N'-divinylethylene urea and/or divinylbenzene
are polymerized is particularly preferred.

The popcorn polymerization is carried out by known methods, for example in the form of precipitation polymerization or by mass polymerization. A procedure in which, as described in EP-A-0 177 812, the popcorn polymerization is initiated by heating, as a crosslinking agent, a mixture of from 99.6 to 98.8% by weight of N-vinylpyrrolidone and from 0.4 to 1.2% by weight of a compound having at least two ethylenically unsaturated double bonds to a temperature of from 100 to 150° C. in the absence of oxygen and polymerization initiators is preferred. This polymerization is initiated in particular by the presence of small amounts of sodium hydroxide solution or potassium hydroxide solution. A polymerizable popcorn polymer forms within a short time and, on addition of the remaining monomer mixture, i.e. in particular of the monomer styrene and of the remaining amount of the monomers c), initiates the popcorn polymerization of these monomers without an induction period. It is also possible to transfer the polymerizable popcorn polymer to a vessel which contains monomer and crosslinking agent or into which monomer and crosslinking agent are then metered.

The popcorn polymerization can also be carried out without a solvent. The monomer mixture comprising a), b) and c) is rendered inert by passing in nitrogen and is then heated to from 20 to 200° C., preferably from 100 to 200° C., particularly preferably from 150 to 180° C. It is advantageous to continue passing a gentle stream of a nitrogen through the monomers during the polymerization too.

The exclusion of oxygen is also achieved by polymerizing the batch at a pressure which is below atmospheric pressure and at which the monomers boil. Depending on the type of monomers used and on the temperature chosen, the mixture polymerizes in the course of from 1 to 20 hours. For example, in the polymerization of N-vinylamides with 2% of N,N'-divinylethyleneurea at 150° C. with stirring by means of a powerful stirrer and at a pressure of 310 mbar, the first polymer particles form after 2.5 hours and the amount of said particles slowly increases until, after a polymerization time of about 10 hours, the reaction mixture consists of a powder. The popcorn polymer is obtained therefrom in yields of more than 90% in the form of a powder having an average particle size of from about 10 µm to 5 mm, preferably from 10 µm to 500 µm.

Precipitation polymerization in water is preferred for the preparation of the popcorn polymers. The concentration of monomers is expediently chosen so that the reaction mixture can be readily stirred throughout the reaction. In the case of too high a concentration of the monomers in water, for example at 95%, the polymer particles often become tacky, making stirring more difficult than in the absence of water. To carry out the reaction in the conventional stirred kettles, monomer concentrations of from about 5 to 30, preferably from 10 to 20, % by weight, based on the aqueous mixture, are chosen. If more powerful stirrers are available, the monomer concentration of the aqueous solution may also be increased to 50% by weight or, if required, even higher.

In some cases, it may be expedient to begin the popcorn polymerization with a relatively concentrated solution and then to add water for dilution in the course of the reaction. The popcorn polymerization is preferably carried out at a pH above 6 in order to avoid possible hydrolysis of the monomers b) and/or c). The pH can be established by adding small amounts of bases, such as sodium hydroxide or ammonia, or of the conventional buffer salts, such as sodium carbonate, sodium bicarbonate or sodium phosphate.

The exclusion of oxygen can best be achieved by heating the mixture to be polymerized to the boil and, if required, additionally working in an inert gas atmosphere by passing, for example, nitrogen through the reaction mixture. The polymerization temperature can be varied within a wide range, for example from about 20 to 200° C., preferably from 50 to 150° C.

In some cases, it may also be advantageous, for complete removal of dissolved oxygen, to add small amounts—from 0.1 to 1% by weight, based on monomer—of a reducing agent, such as sodium sulfite, sodium pyrosulfite, sodium dithionite, ascorbic acid or mixtures of the reducing agents.

In a particularly preferred embodiment of the precipitation polymerization, the water-soluble comonomer, some of the crosslinking agent, water and, if required, a buffer and a reducing agent are heated in a gentle stream of nitrogen until the first polymer particles appear. A mixture rendered inert beforehand by blowing in nitrogen and comprising in particular styrene, if required crosslinking agent and, if required, water as a diluent is then added in the course of from 0.2 to 10 hours. The styrene and the crosslinking agent may also be dissolved in a water-miscible solvent. This may be, for example, a lower alcohol, such as methanol, ethanol, isopropanol, n-propanol or tert-butanol. This procedure has the advantage that the popcorn polymerization takes only a relatively short time. The popcorn polymers can be isolated from the aqueous solution and purified.

The popcorn polymers are usually obtained in a yield of from about 90 to >99% of the theoretical yield. They can be isolated from the aqueous suspension by filtration or centrifugation with subsequent thorough washing with water and drying in a conventional dryer, such as a through-circulation dryer or vacuum dryer, paddle dryer or pneumatic dryer. The popcorn polymers are virtually insoluble in water and all solvents and swell therein only to a slight extent.

The insoluble, only slightly swellable polymers thus obtainable can be used as adsorbents, ion exchangers, carrier materials and filter assistants.

The examples which follow illustrate the preparation of the novel popcorn polymers.

EXAMPLE 1

In a stirred apparatus, 450 g of distilled water, 50 g of N-vinylpyrrolidone, 1 g of N,N'-divinylethyleneurea and 0.05 g of sodium hydroxide were heated to 60° C. while passing in a gentle stream of nitrogen. 0.1 g of sodium dithionite, dissolved in 10 g of distilled water, was then added. The mixture was heated to 80° C. and kept at this temperature. After 20 minutes, white flocks formed. A solution of 3 g of N,N'-divinylethyleneurea in 150 g of styrene was then metered in uniformly in the course of 4 hours. The white flocks were converted into a polymer suspension, which slowly became highly viscous. Dilution was effected with 1000 ml of distilled water in the course of 2 hours. Thereafter, heating was continued for a further hour at 80° C., followed by cooling. The viscous suspension was filtered off and was washed with water in order to remove impurities, such as soluble polymer and monomers. The moist solid was then dried under reduced pressure. The yield of popcorn polymer after drying was 96%.

EXAMPLE 2

In a stirred apparatus, 225 g of distilled water, 25 g of N-vinylpyrrolidone, 0.5 g of N,N'-divinylethyleneurea and 0.05 g of sodium hydroxide were heated to 60° C. while passing in a gentle stream of nitrogen. 0.1 g of sodium dithionite, dissolved in 10 g of distilled water, was then added. The mixture was heated to 80° C. and kept at this temperature. After 20 minutes, white flocks formed. A solution of 6 g of N,N'-divinylethyleneurea in 200 g of styrene was then metered in uniformly in the course of 4 hours. The white flocks were converted into a polymer suspension, which slowly became highly viscous. Dilution was effected with 1000 ml of distilled water in the course of 2 hours. Thereafter, heating was continued for a further 2 hours at 80° C., followed by cooling. The viscous suspension was then filtered off and was washed with water. The moist solid was then dried under reduced pressure. The yield of popcorn polymer after drying was 94%.

EXAMPLE 3

In a stirred apparatus, 225 g of distilled water, 25 g of N-vinylpyrrolidone, 0.5 g of N,N'-divinylethyleneurea and 0.05 g of sodium hydroxide were heated to 60° C. while passing in a gentle stream of nitrogen. 0.1 g of sodium dithionite, dissolved in 10 g of distilled water, was then added. The mixture was heated to 80° C. and kept at this temperature. After 20 minutes, white flocks formed. A solution of 6 g of divinylbenzene in 200 g of styrene was then metered in uniformly in the course of 4 hours. The white flocks were converted into a polymer suspension, which slowly became highly viscous. Dilution was effected with 1000 ml of distilled water in the course of 2 hours. Thereafter, heating was continued for a further 2 hours at 80° C., followed by cooling. The viscous suspension was then filtered off and was washed with water. The moist solid was then dried under reduced pressure. The yield of popcorn polymer after drying was 92%.

EXAMPLE 4

In a stirred apparatus, 225 g of distilled water, 25 g of N-vinylpyrrolidone, 0.5 g of N,N'-divinylethyleneurea and 0.05 g of sodium hydroxide were heated to 60° C. while passing in a gentle stream of nitrogen. 0.1 g of sodium dithionite, dissolved in 10 g of distilled water, was then added. The mixture was heated to 80° C. and kept at this temperature. After 20 minutes, white flocks formed. 200 g of styrene were then metered in uniformly in the course of 4 hours. The white flocks were converted into a polymer suspension, which slowly became highly viscous. Dilution was effected with 1000 ml of distilled water in the course of 2 hours. Thereafter, heating was continued for a further 2 hours at 80° C., followed by cooling. The viscous suspension was then filtered off and was washed with water. The moist solid was then dried under reduced pressure. The yield of popcorn polymer after drying was 94%.

EXAMPLE 5

In a stirred apparatus, 225 g of distilled water, 25 g of N-vinylpyrrolidone, 0.5 g of N,N'-divinylethyleneurea and 0.05 g of sodium hydroxide were heated to 60° C. while passing in a gentle stream of nitrogen. 0.1 g of sodium dithionite, dissolved in 10 g of distilled water, was then added. The mixture was heated to 80° C. and kept at this temperature. After 20 minutes, white flocks formed. A solution of 6 g of N,N'-divinylethyleneurea and 300 g of styrene in 200 g of absolute ethanol was then metered in uniformly in the course of 4 hours. The white flocks were converted into a polymer suspension, which slowly became highly viscous. Dilution was effected with 1000 ml of distilled water in the course of 2 hours. Thereafter, heating was continued for a further 2 hours at 80° C., followed by cooling. The viscous suspension was then filtered off and was washed with water. The moist solid was then dried under reduced pressure. The yield of popcorn polymer after drying was 96%.

EXAMPLE 6

In a stirred apparatus, 20 g of distilled water, 2 g of N-vinylpyrrolidone, 0.05 g of N,N'-divinylethylene urea and 0.01 g of sodium hydroxide were heated to 60° C. while passing in a gentle stream of nitrogen. 0.05 g of sodium dithionite, dissolved in 5 g of distilled water, was then added. The mixture was heated to 80° C. and kept at this temperature. After 20 minutes, white flocks formed. A solution of 6 g of divinylbenzene in 200 g of styrene was then metered in uniformly in the course of 6 hours. 1000 ml of distilled water were added simultaneously in the course of 6 hours. Thereafter, heating was continued for a further 2 hours at 80° C., followed by cooling. The viscous suspension was then filtered off and was washed with water. The moist solid was then dried under reduced pressure. The yield of popcorn polymer after drying was 89%.

We claim:

1. An insoluble, only slightly swellable popcorn polymer containing
    a) from 89 to 99% by weight of styrene and/or at least one monounsaturated styrene derivative,
    b) from 0.1 to 40% by weight of at least one N-vinyllactam or N-vinylamine and
    c) from 0.1 to 10% by weight of at least one difunctional crosslinking component,
the stated percentages by weight of the individual components a) to c) summing to 100%.

2. A popcorn polymer as claimed in claim 1, containing
    a) from 89 to 99% by weight of styrene,
    b) from 0.5 to 30% by weight of at least one N-vinyllactam or N-vinylamine selected from the group consisting of N-vinylpyrrolidone, N-vinylpiperidone, N-vinylcaprolactam, N-vinylimidazole and methylated N-vinylimidazole and N-vinylformamide, and
    c) from 0.1 to 8% by weight of at least one difunctional crosslinking component selected from the group consisting of N,N'-divinylethyleneurea, N,N'-divinylpropyleneurea and divinylbenzene.

3. A popcorn polymer as claimed in claim 1, containing
    a) from 89 to 97% by weight of styrene,
    b) from 1 to 25% by weight of N-vinylpyrrolidone and
    c) from 0.2 to 5% by weight of N,N'-divinylethyleneurea and/or divinylbenzene.

4. A popcorn polymer as claimed in claim 1, which additionally contains from 0 to 20% by weight of further monomers d) capable of free radical polymerization.

5. A process for the preparation of insoluble, only slightly swellable popcorn polymers, defined according to claim 1, wherein
    a) from 89 to 99% by weight of styrene and/or at least one monounsaturated styrene derivative,
    b) from 0.1 to 40% by weight of at least one N-vinyllactam or N-vinylamine and
    c) from 0.1 to 10% by weight of at least one difunctional crosslinking component,
the stated percentages by weight of the individual components summing to 100%, are polymerized in the absence of oxygen and polymerization initiators.

6. A process as claimed in claim 5, wherein
    a) from 89 to 99% by weight of styrene,
    b) from 0.5 to 30% by weight of at least one N-vinyllactam or N-vinylamine selected from the group consisting of N-vinylpyrrolidone, N-vinylpiperidone, N-vinylcaprolactam, N-vinylimidazole and methylated N-vinylimidazole and N-vinylformamide, and
    c) from 0.1 to 8% by weight of at least one difunctional crosslinking component selected from the group consisting of N,N'-divinylethyleneurea, N,N'-divinylpropyleneurea and divinylbenzene are polymerized.

7. A process as claimed in claim 5, wherein
    a) from 89 to 97% by weight of styrene,
    b) from 1 to 25% by weight of N-vinylpyrrolidone and
    c) from 0.2 to 5% by weight of N,N'-divinylethyleneurea and/or divinylbenzene
are polymerized.

8. A process as claimed in claim 5, wherein the polymerization is carried out at from 205c to 2005c.

9. An ion exchanger comprising an insoluble, only slightly swellable popcorn polymer, defined according to claim 1.

10. An adsorber resin comprising an insoluble, only slightly swellable popcorn polymer, defined according to claim 1.

11. A filter assistant comprising an insoluble, only slightly swellable popcorn polymer, defined according to claim 1.

* * * * *

UNITED STATES PATENT AND TRADEMARK OFFICE
CERTIFICATE OF CORRECTION

PATENT NO.     : 6,525,156 B1
DATED          : February 25, 2003
INVENTOR(S)    : Ernst et al.

It is certified that error appears in the above-identified patent and that said Letters Patent is hereby corrected as shown below:

Column 8,
Line 46, replace "205c to 2005c" should be -- 20°C to 200°C --.

Signed and Sealed this

Eighth Day of April, 2003

JAMES E. ROGAN
*Director of the United States Patent and Trademark Office*